(12) United States Patent
Su

(10) Patent No.: US 10,834,739 B2
(45) Date of Patent: Nov. 10, 2020

(54) WIRELESS COMMUNICATION METHOD AND ASSOCIATED ELECTRONIC DEVICE

(71) Applicant: MEDIATEK INC., Hsin-Chu (TW)

(72) Inventor: Shih-Chang Su, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 24 days.

(21) Appl. No.: 16/247,432

(22) Filed: Jan. 14, 2019

(65) Prior Publication Data

US 2019/0223193 A1 Jul. 18, 2019

Related U.S. Application Data

(60) Provisional application No. 62/618,090, filed on Jan. 17, 2018.

(51) Int. Cl.
| | | |
|---|---|---|
| *H04W 4/00* | (2018.01) | |
| *H04W 72/12* | (2009.01) | |
| *H04W 88/06* | (2009.01) | |

(52) U.S. Cl.
CPC ........ *H04W 72/1215* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 2008/0279163 | A1* | 11/2008 | Desai | H04W 52/267 370/338 |
| 2012/0120944 | A1* | 5/2012 | Yang | H04L 7/04 370/350 |
| 2012/0170556 | A1* | 7/2012 | Tsfati | H04W 72/1215 370/338 |
| 2012/0170557 | A1* | 7/2012 | Tsfati | H04W 72/1215 370/338 |
| 2015/0055516 | A1* | 2/2015 | Smadi | H04W 72/1215 370/280 |
| 2016/0119935 | A1* | 4/2016 | Wilhelmsson | H04W 72/12 |
| 2016/0174280 | A1 | 6/2016 | Singh | |
| 2016/0380665 | A1* | 12/2016 | Lee | H04B 1/18 455/552.1 |
| 2018/0041975 | A1* | 2/2018 | Yi | H04W 72/048 |
| 2018/0242340 | A1* | 8/2018 | Pu | H04W 52/0274 |
| 2018/0368082 | A1* | 12/2018 | O'Shea | H04W 4/80 |
| 2019/0082465 | A1* | 3/2019 | Yoshimoto | H04W 88/12 |

* cited by examiner

*Primary Examiner* — Clemence S Han
(74) *Attorney, Agent, or Firm* — Winston Hsu

(57) ABSTRACT

A wireless communication method includes: generating a first communication information according to a second communication information, wherein the first communication information is arranged to indicate a transmission capable period and a reception capable period of the device arranged to communicate with a peer in a first communication network, and the second communication information is arranged to indicate a transmission period and a reception period of the device for communicating in a second communication network which is different from the first communication network; and transmitting a first frame comprising the first communication information to the peer in the first communication network to initiate a first communication phase with the peer.

13 Claims, 13 Drawing Sheets

WIRELESS COMMUNICATION METHOD AND ASSOCIATED ELECTRONIC DEVICE

CROSS REFERENCE TO RELATED APPLICATIONS

This application claims the benefit of U.S. Provisional Application No. 62/618,090, which was filed on Jan. 17, 2018, the contents of which are incorporated herein by reference.

BACKGROUND

When two or more radio services, such as Bluetooth, LTE, and WLAN, co-located in a traditional electronic device, the device (referred to as a co-located radio device) typically adapts a time division duplex mode operation to prevent interference between the radio services. In some scenarios, a poor transmission/reception period arrangement for the multiple radio services might cause severe interference to received signals/packets due to the strong transmission of other transmitted signals/packets by co-located radios at the device end. In addition, in some scenarios, a poor transmission/reception period arrangement might result in a miss of transmitting an acknowledgement responding to received signals/packets, causing the peer radio to re-transmit the signals/packets, which causes inefficient frame exchange. Therefore, a novel wireless communication method is desired to solve the aforementioned problem.

SUMMARY

One of the objectives of the present invention is to provide a wireless communication method and an associated electronic device to solve the aforementioned problem.

According to an embodiment of the present invention, a wireless communication method is disclosed, comprising: generating a first communication information according to a second communication information, wherein the first communication information is arranged to indicate a transmission capable period and a reception capable period of the device arranged to communicate with an peer (for example, WLAN access point) in a first communication network, and the second communication information is arranged to indicate a transmission period and a reception period of the device for communicating in a second communication network which is different from the first communication network; and transmitting a first frame comprising the first communication information to the peer in the first communication network to initiate a first communication phase with the peer.

According to another embodiment of the present invention, a wireless communication method is disclosed, comprising: receiving a first frame comprising a first communication information from a device in a first communication network (for example, WLAN STA) to initiate a first communication phase with the device; wherein the first communication information is arranged to indicate a transmission capable period and a reception capable period of the device arranged to communicate with the peer in a first communication network; wherein the first communication information is generated according to a second communication information, and the second communication information is arranged to indicate a transmission period and a reception period of the device for communicating in a second communication network which is different from the first communication network.

According to an embodiment of the present invention, an electronic device is disclosed. The electronic device comprises a transmitter, a storage device and a processor, wherein the storage device is arranged to store a program code and the processor is arranged to execute the program code. When loaded and executed by the processor, the program code instructs the processor to execute the following steps: generating a first communication information according to a second communication information, wherein the first communication information is arranged to indicate a transmission capable period and a reception capable period of the device arranged to communicate with an peer in a first communication network, and the second communication information is arranged to indicate a transmission period and a reception period of the device for communicating in a second communication network which is different from the first communication network; and controlling the transmitter to transmit a first frame comprising the first communication information to the peer in the first communication network to initiate a first communication phase with the access point.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
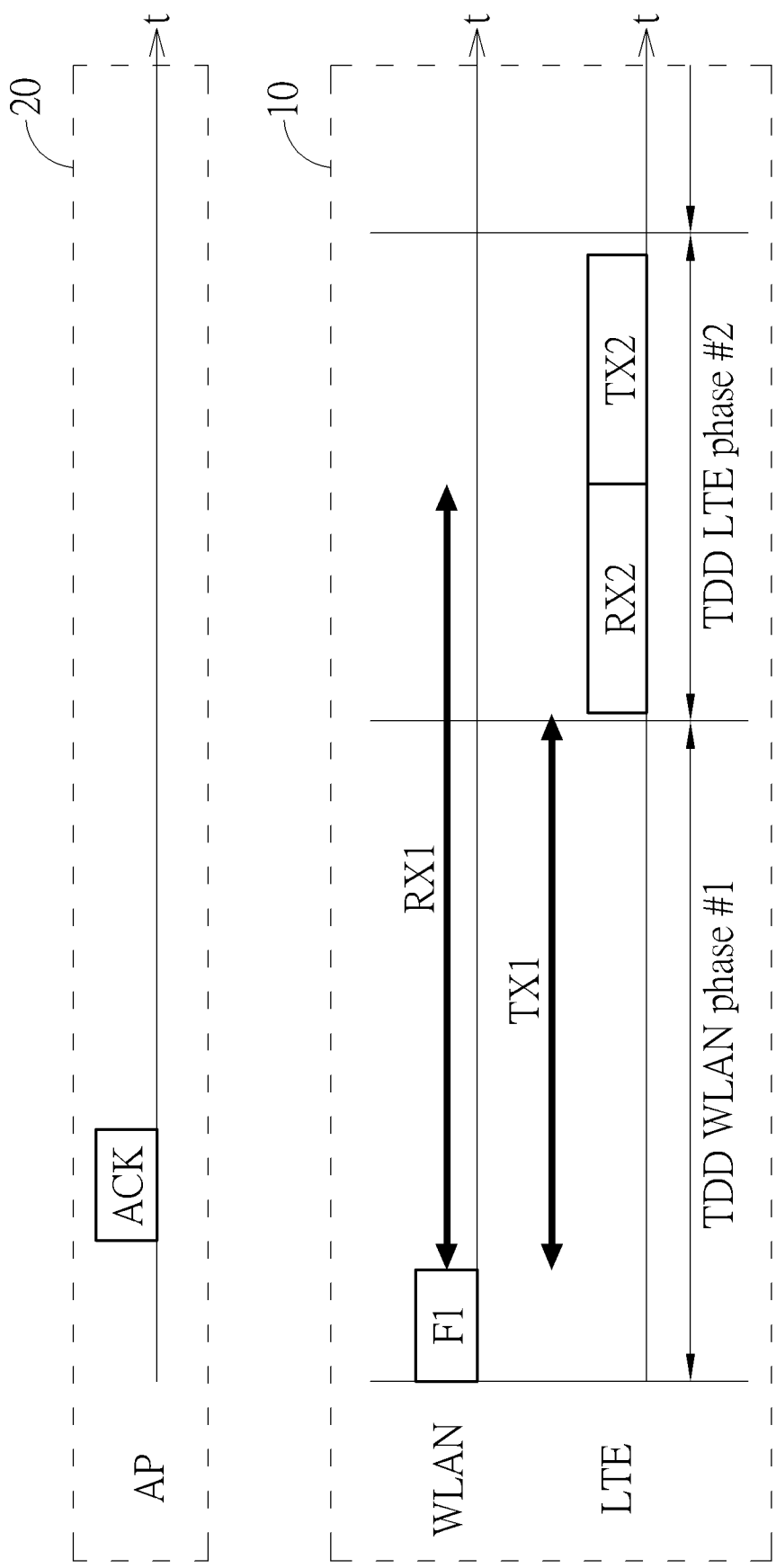
FIG. 1A is a diagram illustrating a wireless communication method applied to a device for communicating in a first communication network and a second communication network according to an embodiment of the present invention.

FIG. 1A is a diagram illustrating a wireless communication method applied to a device 10 for communicating in a first network and a second network according to an embodiment of the present invention. In this embodiment, the first network is a Wireless LAN (WLAN) network, the second network is a Long Term Evolution (LTE) network, and the device may be a co-located radio device such as a smart phone communicating in the WLAN network and the LTE network. This, however, is only for illustrative purposes, and not a limitation of the present invention. As mentioned above, the device 10 utilizes a time division duplex (TDD) mode operation to communicate in both the co-located WLAN and LTE radios network for preventing mutual interference. As shown in FIG. 1A, the device 10 schedules the WLAN radio first to initiate a first TDD WLAN phase (annotated as #1 in FIG. 1A), and then schedules the LTE network to initiate a first TDD LTE phase (annotated as #2 in FIG. 1A). When the device 10 only adapts the WLAN network and the LTE network for communication, a second TDD WLAN phase will follow the first TDD LTE phase for the device 10 to communicate in the WLAN network. Those skilled in the art should readily understand that the device 10 is not limited to adapt only two networks for communication, and that the illustration shown in FIG. 1A is only to aid comprehension.

In the wireless communication method proposed by the present invention, a control circuit (or a processor) of the device 10 generates a first communication information according to a second communication information. The first communication information is arranged to indicate a transmission capable period TX1 and a reception capable period RX1 of the device arranged to communicate with an access point (AP) 20 in a first communication network (i.e. the WLAN network in this embodiment), and the second communication information is arranged to indicate a transmission period TX2 and a reception period RX2 of the device for communicating in a second communication network (i.e. the LTE network). More specifically, for communicating in the LTE network, the communication information (for example, downlink control information, DCI) is usually scheduled by base station and carried in PDCCH. The LTE UE in device 10 may decode the addressed DCIs and derive the transmission capable period TX2 and the reception capable period RX2 of the device 10 for communicating in the LTE network. Therefore, the control circuit of the device obtains the second communication information of the transmission period TX2 and the reception period RX2 such as which of the transmission period TX2 and the reception period RX2 comes up first, the starting time of the transmission period TX2 and the reception period RX2, etc.

Next, the control circuit of the device 10 generates the first communication information according to the second communication information. More specifically, when the control circuit of the device 10 learns the reception period RX2 of the TDD LTE phase comes up first, it can arrange a longest reception capable period RX1 of the device 10 as shown in FIG. 1A for communicating with the AP 20. By this elaborate arrangement, the chance of packets/signals transmitted from the AP 20 in the WLAN network being interfered by the transmission of packets/signals from co-located LTE UE radio is greatly decreased, and the successful rate of packets transmission between the AP 20 and the device 10 can be improved. Likewise, the transmission capable period TX1 of the device 10 arranged to communicate with the AP 20 in the WLAN network can also be elaborately arranged as shown in FIG. 1A. Accordingly, the first communication information may comprise the lengths and the starting times of the reception capable period RX1 and the transmission capable period TX1.

Figure 1B:
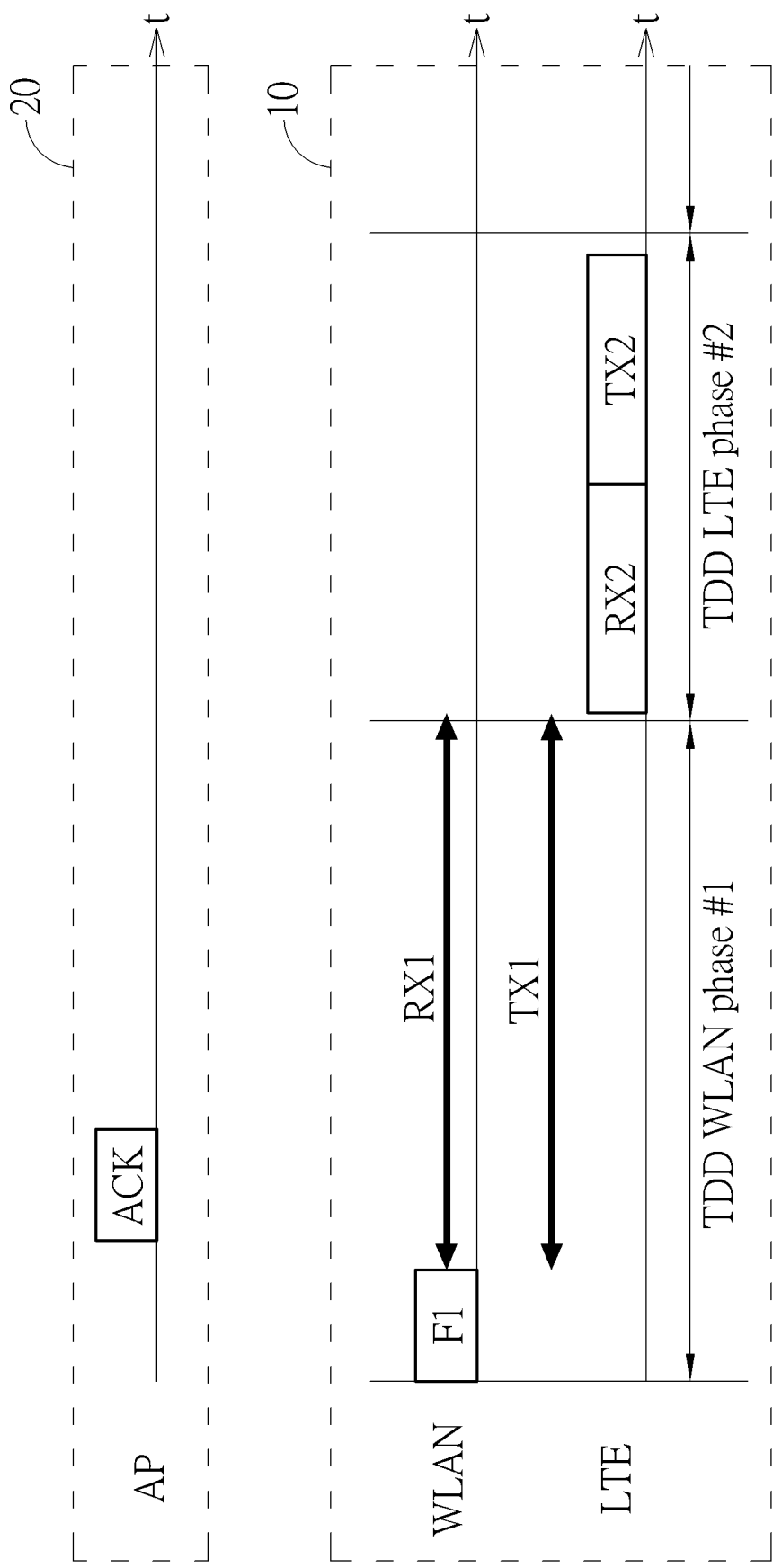
FIG. 1B is a diagram illustrating a wireless communication method applied to a device 10 for communicating in the first network and the second network according to another embodiment of the present invention.

The control circuit of the device 10 transmits a frame F1 comprising the first communication information to inform the AP 20 of the reception capable period RX1 and the transmission capable period TX1 timing during the TDD WLAN phase (annotated as #1 in FIG. 1A). It should be noted that the frame F1 may be an action frame in this embodiment; however, this is only for illustrative purposes, and the type of the frame F1 is not a limitation of the present invention. After receiving frame F1, the AP 20 accordingly transmits an ACK frame to the device 10 to acknowledge that the frame F1 is successfully received. However, FIG. 1A is only for illustrative purpose, the length of the reception capable period RX1 is not necessarily to overlap the reception capable period RX2. Refer to FIG. 1B, which is a diagram illustrating a wireless communication method applied to the device 10 for communicating in the first network and the second network according to another embodiment of the present invention. As shown in FIG. 1B, the control circuit of the device arranges the reception capable period RX1 as long as the transmission capable period TX1 instead.

Figure 2:
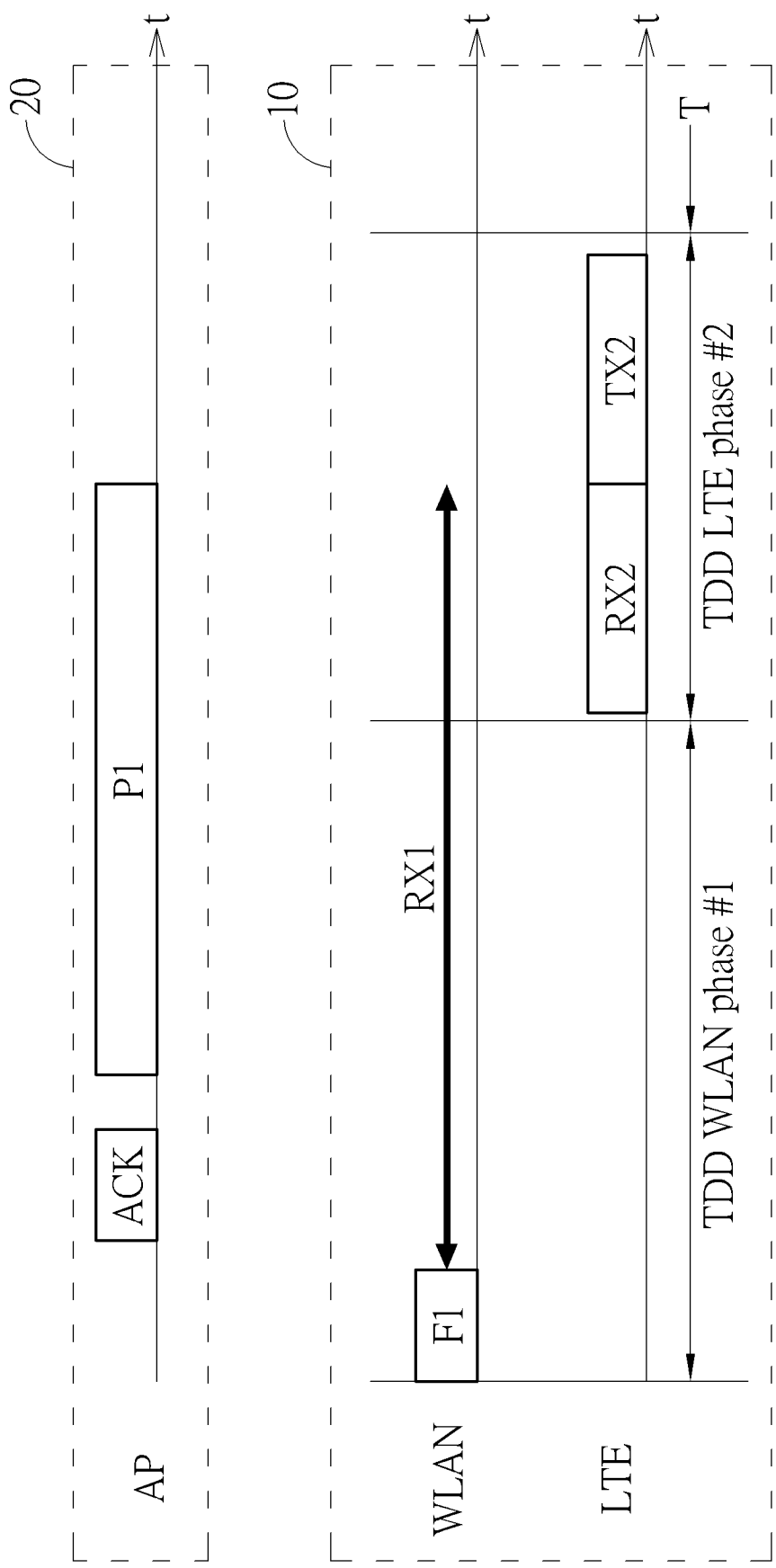
FIG. 2 is a diagram illustrating the wireless communication method shown in FIG. 1 according to a first embodiment of the present invention.

FIG. 2 is a diagram illustrating the wireless communication method shown in FIG. 1A according to a first embodiment of the present invention. As shown in FIG. 2, after the frame F1 is received, the AP 20 learns the transmission capable period TX1 and the reception capable period RX1 of the device for communicating in the WEAN network and accordingly can schedule the frame exchange between the AP 20 and the device 10. The AP 20 may transmit a packet P1 to the device 10 whose length overlaps the reception period RX2 of the device 10 for communicating in the LTE network and not interfere to or not interfered by LTE UE radio. For example, as shown in FIG. 2, the length of the packet P1 transmitted from the AP 20 reaches the end of the reception period RX2 of the device 10 for communicating in the LTE network, which is considered the longest packet P1 transmitted from the AP 20 to the device 10. As mentioned in the prior art, if the packet P1 is received by the device 10 when the device 10 is transmitting signals/packets to another device (e.g. a base station) in the LTE network, the power of the signals/packets may be strong enough to sabotage the reception of the packet P1. In the embodiment of FIG. 2, however, the packet P1 is received by the device 10 when the device 10 is also receiving signals/packets from another device (e.g. a base station) in the reception period RX2 of the device 10 for communicating in the LTE network, wherein the packet P1 received at the device 10 is not interfered by co-located LTE UE radio. Therefore, the chance of the packet P1 being sabotaged by signals/packets from the other device is greatly reduced. The length of the packet P1 transmitted from the AP 20 is only for illustrative purposes, and is not a limitation of the present invention.

Figure 3:
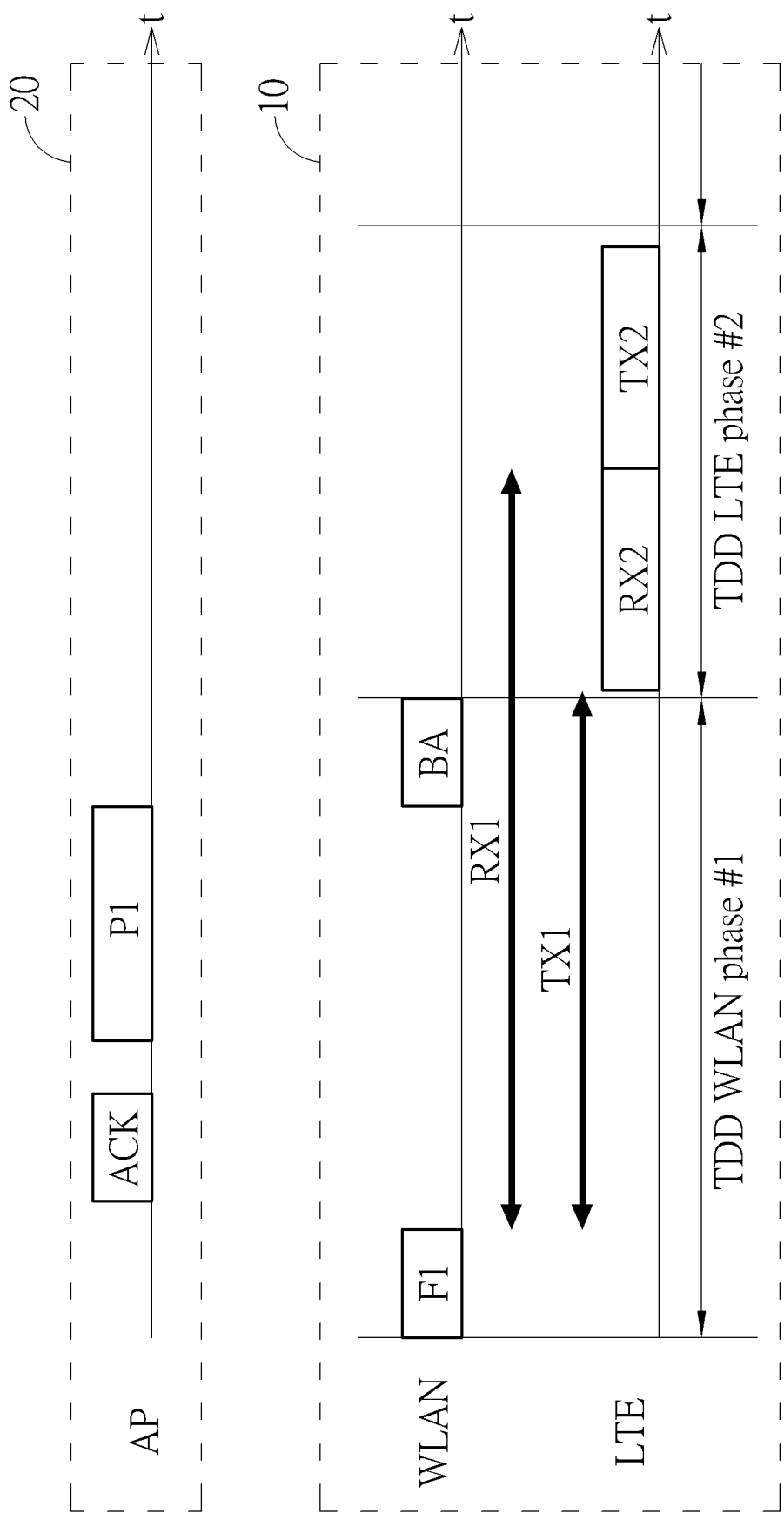
FIG. 3 is a diagram illustrating the wireless communication method shown in FIG. 1 according to a second embodiment of the present invention.

FIG. 3 is a diagram illustrating the wireless communication method shown in FIG. 1A according to a second embodiment of the present invention. As shown in FIG. 3, after the frame F1 is received, the AP 20 learns the transmission capable period TX1 and the reception capable period RX1 of the device 10 for communicating in the WLAN network. The AP 20 may schedule and start a frame exchange of P1 to the device 10 and the whole frame exchange sequences do not go beyond the end of WLAN phase #1. In this case, the reception of the packet P1 transmitted from the AP 20 to the device 10 will not be interfered by co-located radios in device 10, and device 10 could transmit ACK/BA frame to AP 20 to acknowledge successful reception of the packet P1.

Figure 4:
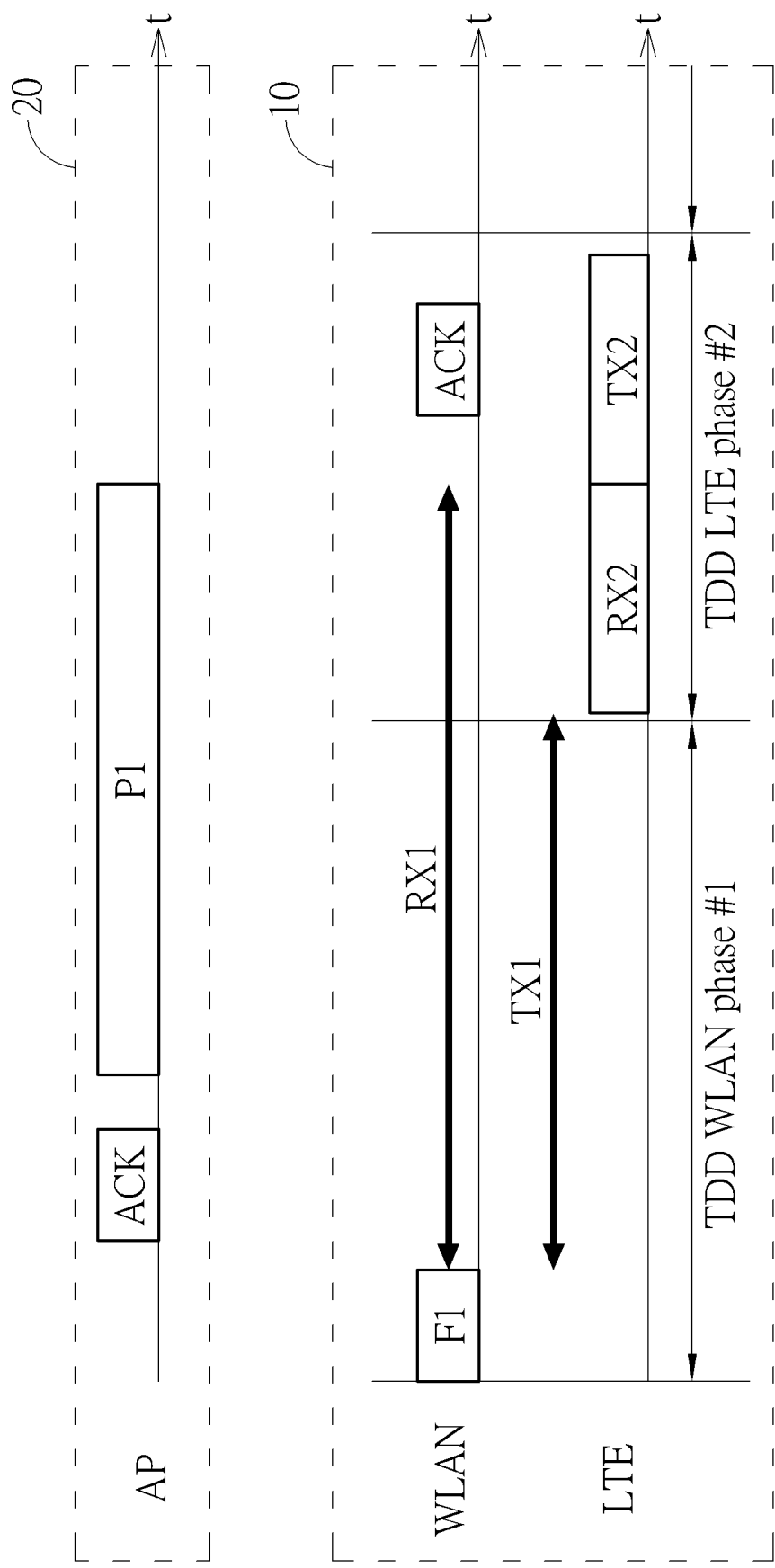
FIG. 4 is a diagram illustrating the wireless communication method shown in FIG. 1 according to a third embodiment of the present invention.

As mentioned in the prior art, without the timing information of the transmission capable period and the reception capable period of device 10, AP 20 may start a frame exchange sequences and expected a acknowledge frame from device 10, but if device 10 in not in transmission capable period, then device 10 is not able to transmit acknowledge frame, resulting in a failed frame exchange. By the wireless communication method proposed by the present invention, the acknowledgement corresponding to the packet P1 is also elaborately arranged. FIG. 4 is a diagram illustrating the wireless communication method shown in FIG. 1A according to a third embodiment of the present invention. As shown in FIG. 4, after the end of the reception capable period RX1, the transmission capable period TX1 of the device 10 for communicating with the AP 20 in the WLAN network comes up as well as the transmission period TX2. Therefore, the device 10 may transmit an immediate acknowledgement frame (ACK/BA) corresponding to the packet P1 in the transmission capable period TX1 right after the successful reception of the packet P1. The timing of the transmission of the acknowledgement frame (ACK/BA) corresponding to the packet P1 is not a limitation of the present invention.

Figure 5:
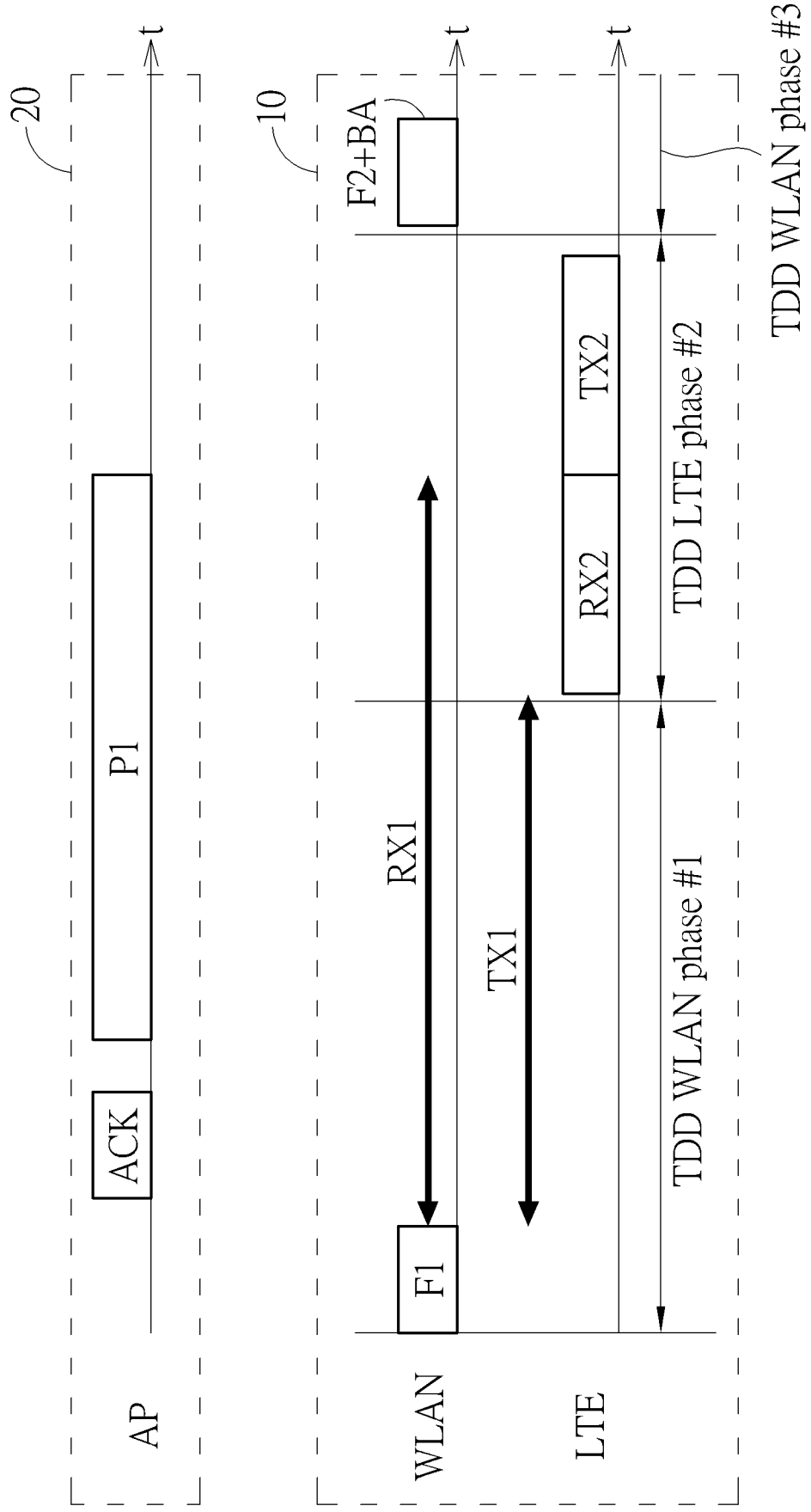
FIG. 5 is a diagram illustrating the wireless communication method shown in FIG. 1 according to a fourth embodiment of the present invention.

FIG. 5 is a diagram illustrating the wireless communication method shown in FIG. 1A according to a fourth embodiment of the present invention. As shown in FIG. 5, after the packet P1 is received, the device 10 does not transmit the acknowledgement frame (ACK/BA) corresponding to the packet P1 immediately. Instead, the acknowledgement frame corresponding to the packet P1 is carried in a frame F2 transmitted by the device 10 to the AP 20, wherein the frame F2 is arranged to initiate a second TDD WLAN phase (annotated as #3) with the AP 20 after the TDD LTE phase, and further comprises the information of the transmission capable period and the reception capable period of the device 10 for communicating with the AP 20 in the WLAN network, as with the frame F1.

Figure 6A:
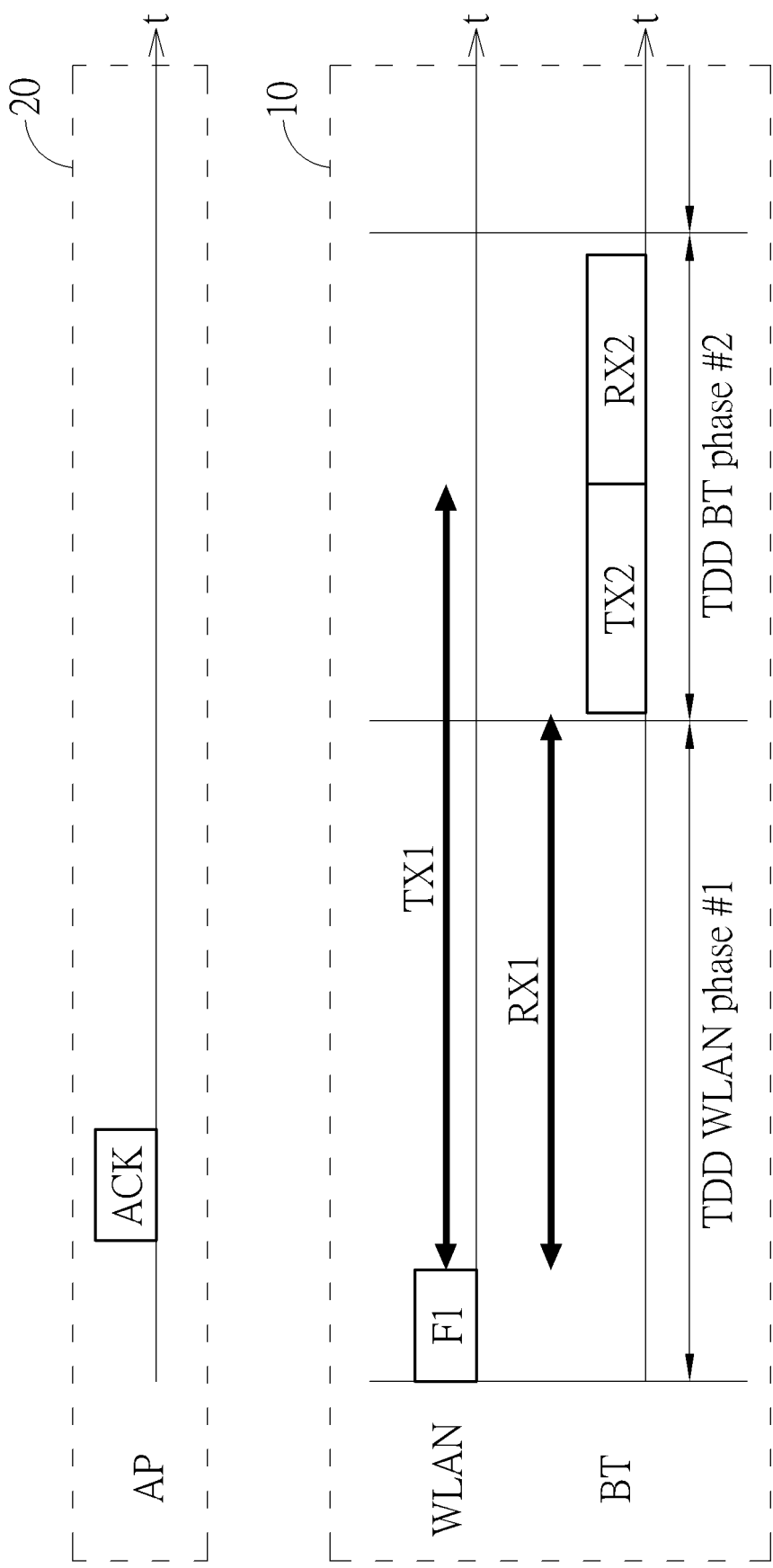
FIG. 6A is a diagram illustrating a wireless communication method applied to a device for communicating in a first communication network and a second communication network according to another embodiment of the present invention.

FIG. 6A is a diagram illustrating a wireless communication method applied to the device 10 for communicating in a first communication network and a second communication network according to another embodiment of the present invention. In this embodiment, the first radio is a WLAN, the second co-located radio is a Bluetooth (BT), and the device may be a smart phone communicating in the WLAN network and the BT network. This is only for illustrative purposes, and is not a limitation of the present invention. The device 10 utilizes the TDD mode operation to communicate in both the WLAN network and the BT network for preventing mutual interference. As shown in FIG. 6, the device 10 schedules the WLAN network first to initiate a first TDD WLAN phase (noted as #1 in FIG. 6A), then schedules the BT network to initiate a first TDD BT phase (noted as #2 in FIG. 6A). When the device 10 only adapts the WLAN network and the BT network for communication, a second TDD WLAN phase will follow the first TDD TE phase for the device 10 to communicate in the WLAN network. Those skilled in the art should readily understand that the device 10 is not limited to adapt only two networks for communication, and the illustration shown in FIG. 6 is only for comprehension.

In the wireless communication method proposed by the present invention, a control circuit (or a processor) of the device 10 generates a first communication information according to a second communication information. The first communication information is arranged to indicate a transmission capable period TX1 and a reception capable period RX1 of the device arranged to communicate with an access point (AP) 20 in a first communication network (i.e. the WLAN network in this embodiment), and the second communication information is arranged to indicate a transmission period TX2 and a reception period RX2 of the device for communicating in a second communication network (i.e. the BT network). More specifically, for communicating in the BT network, there is usually a master and a slave, in which the master may determine when the slave should be in reception or transmission slotss. The transmission period TX2 and the reception period RX2 of the device 10 for communicating in the BT network may be pre-determined by the master. Therefore, the control circuit of the device 10 obtains the second communication information of the transmission period TX2 and the reception period RX2, e.g. which of the transmission period TX2 and the reception period RX2 comes up first, the starting time of the transmission period TX2 and the reception period RX2, etc.

Figure 6B:
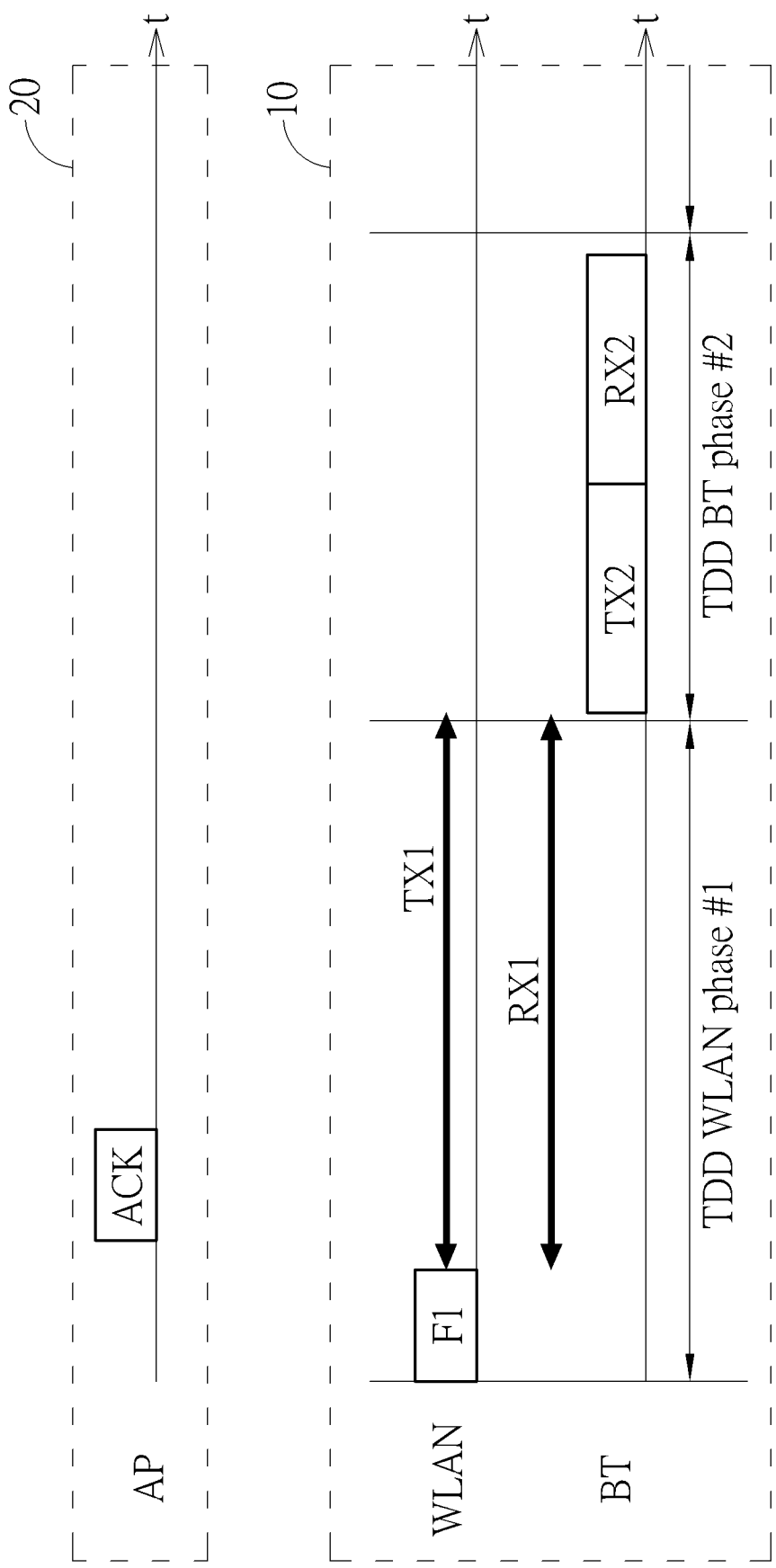
FIG. 6B is a diagram illustrating a wireless communication method applied to a device 10 for communicating in the first network and the second network according to yet another embodiment of the present invention.

Next, the control circuit of the device 10 generates the first communication information according to the second communication information. More specifically, when the control circuit of the device 10 learns that the transmission period TX2 of the TDD BT phase comes up first, if simultaneously transmissions with BT radio during TX2 period is adopted, it can arrange a longest transmission capable period TX1 of the device 10 as shown in FIG. 6A for communicating with the AP 20. By this elaborate arrangement, the interference among co-located radio packets/signals (WLAN, BT) is greatly decreased, and the efficiencies of successful frame exchange between the AP 20 and the device 10 can be improved. Likewise, the reception capable period RX1 of the device 10 arranged to communicate with the AP 20 in the WLAN network can also be elaborately arranged as shown in FIG. 6. Accordingly, the first communication information may comprise the lengths and the starting times of the reception capable period RX1 and the transmission capable period TX1. As mentioned in the embodiment of FIG. 1A, the length of the transmission capable period TX1 is not necessarily to overlap the transmission period TX2. Refer to FIG. 6B, which is a diagram illustrating a wireless communication method applied to the device 10 for communicating in the first network and the second network according to yet another embodiment of the present invention. As shown in FIG. 6B, the control circuit of the device arranges the transmission capable period TX1 as long as the reception capable period RX1 instead.

The control circuit of the device 10 transmits a frame F1 comprising the first communication information to inform the AP 20 of the reception capable period and the transmission capable period timing during the TDD WLAN phase (annotated as #1 in FIG. 6A). It should be noted that the frame F1 may be an action frame in this embodiment; however, this is only for illustrative purposes, and the type of the frame F1 is not a limitation of the present invention. After receiving frame F1, the AP 20 accordingly transmits an ACK frame to the device 10 to acknowledge 10 that the frame F1 is successfully received.

As shown in FIGS. 1A and 6A, as long as the reception capable RX1 is not overlapped with TX2 of co-located radios, the reception of WLAN radio in device 10 will not be interfered by the transmission signal from co-located radios. And as long as the transmission capable TX1 is not overlapped with RX2 of co-located radios, the reception of co-located radios in device 10 will not be interfered by the transmission signal from WLAN radio in device 10.

Figure 7:
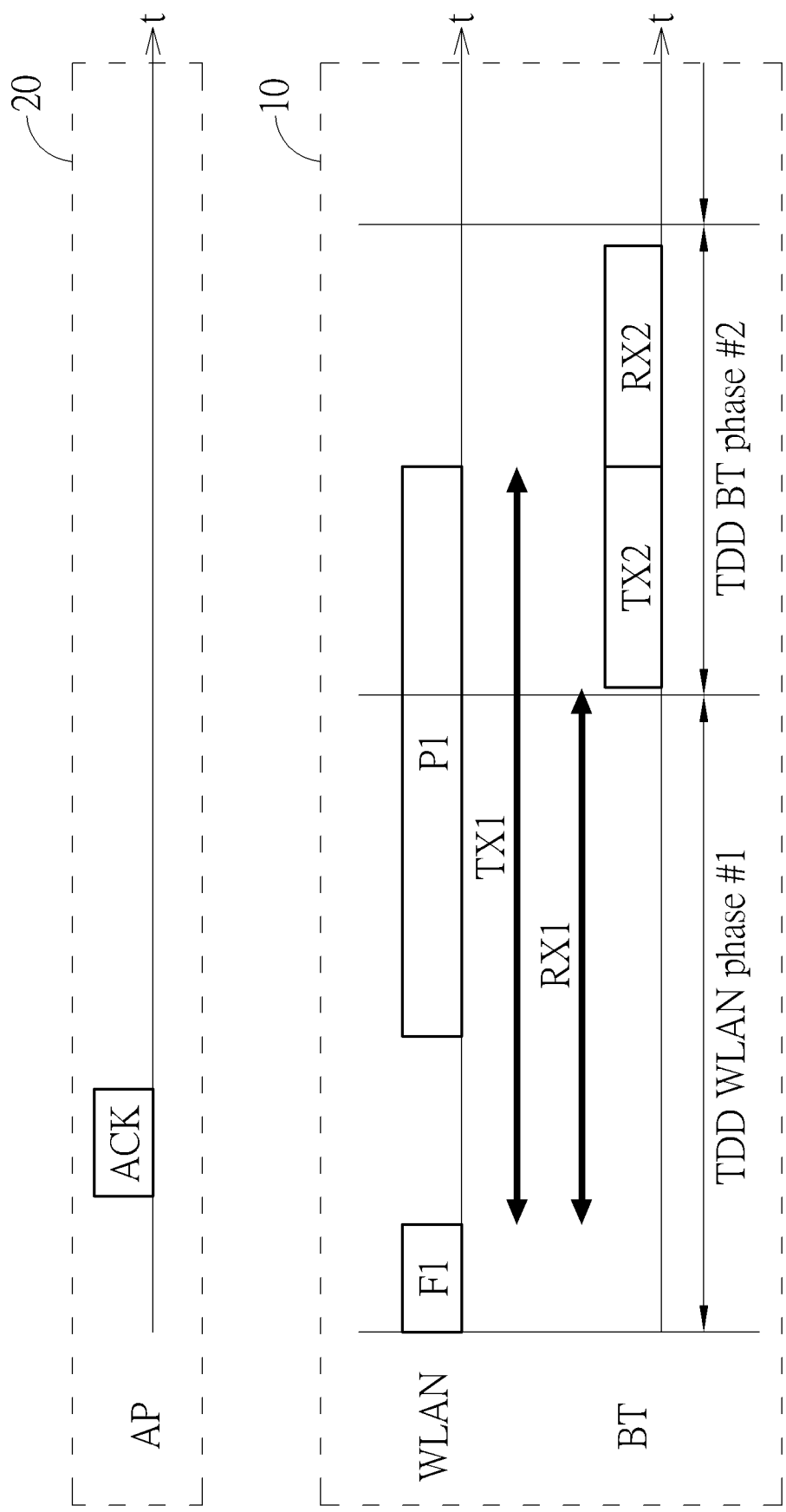
FIG. 7 is a diagram illustrating the wireless communication method shown in FIG. 6A according to a first embodiment of the present invention.

FIG. 7 is a diagram illustrating the wireless communication method shown in FIG. 6A according to a first embodiment of the present invention. As shown in FIG. 7, after the frame F1 is received, the AP 20 learns the transmission capable period TX1 and the reception capable period RX1 of the device for communicating in the WLAN network and accordingly can schedule frame exchange sequence between the AP 20 and the device 10. The device 10 may transmit a packet P1 to the AP 20 whose transmission could fit in period TX1 of the device 10. For example, as shown in FIG. 7, if simultaneously transmissions with BT radio during TX2 period is adopted, the length of the packet P1 transmitted from the device 10 reaches the transmission period TX2 of the device 10 TDD BT phase #2, which is considered the longest packet P1 transmitted from the device 10 to the AP 20. The length of the packet P1 transmitted to the AP 20 is only for illustrative purposes, and is not a limitation of the present invention.

Figure 8:
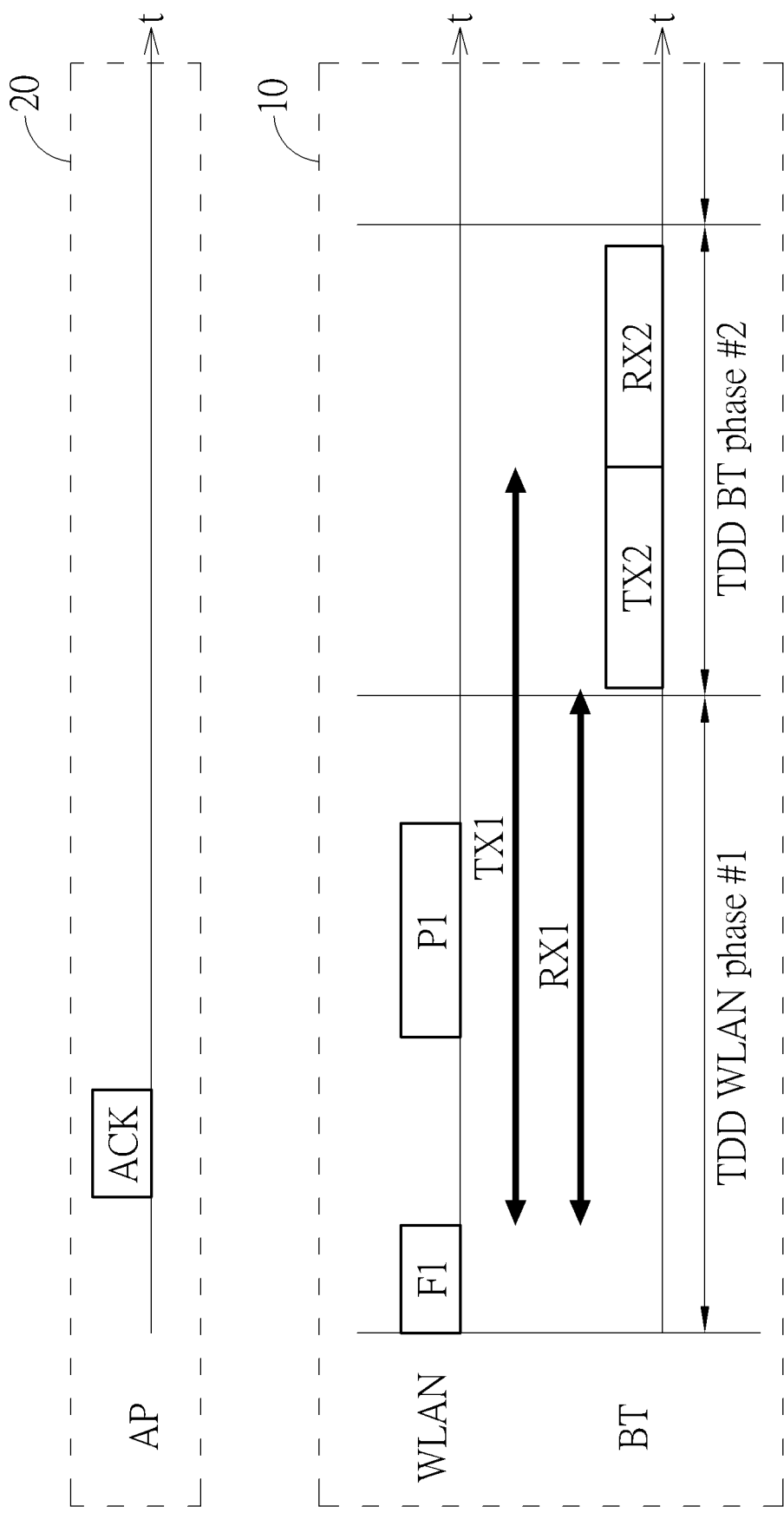
FIG. 8 is a diagram illustrating the wireless communication method shown in FIG. 6A according to a second embodiment of the present invention.

FIG. 8 is a diagram illustrating the wireless communication method shown in FIG. 6A according to a second embodiment of the present invention. As shown in FIG. 8, the device 10 may schedule and start frame exchange sequence of P1 to the AP 20 with the whole exchange time not go beyond end of WLAN phase #1.

Figure 9:
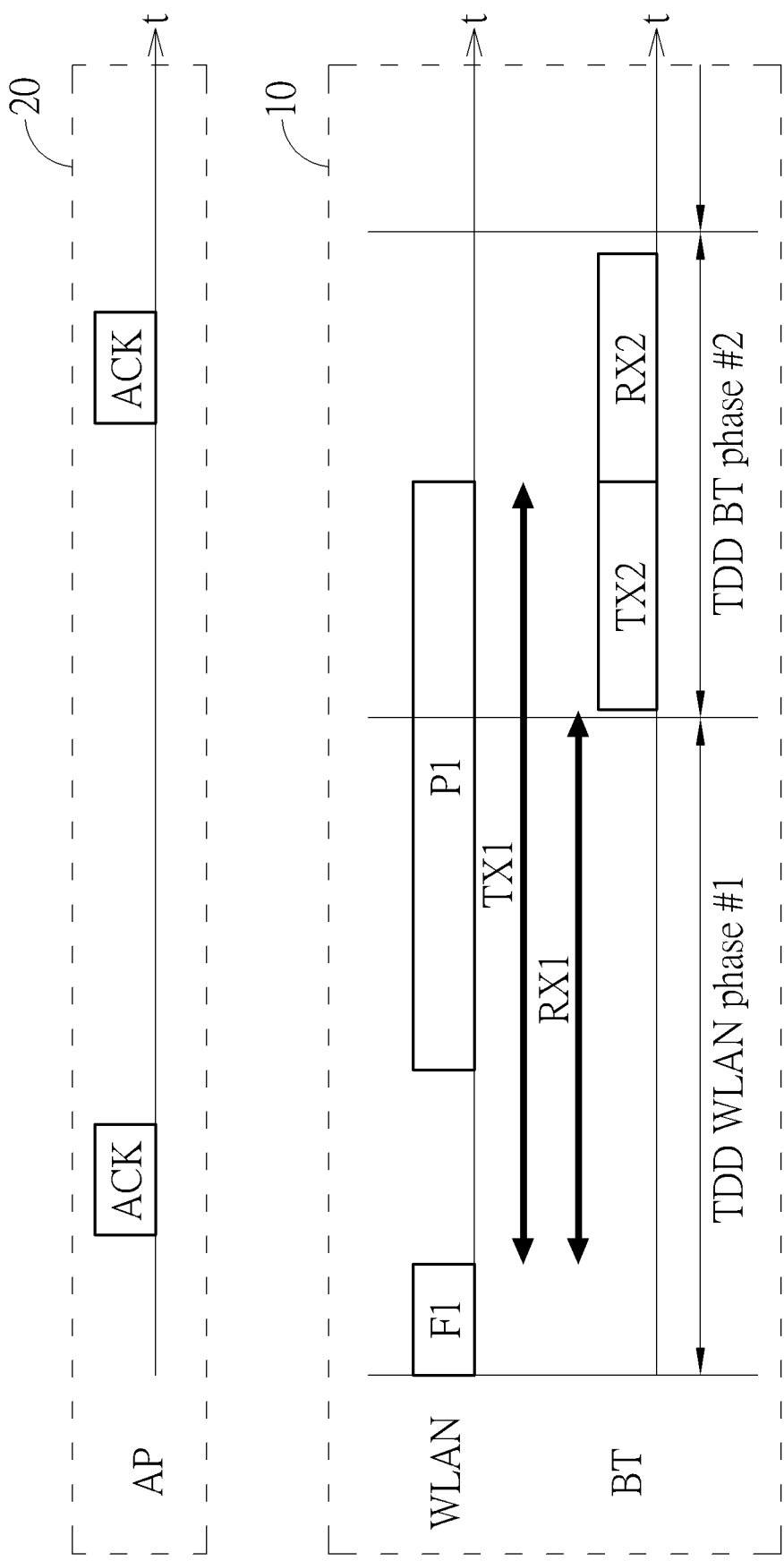
FIG. 9 is a diagram illustrating the wireless communication method shown in FIG. 6A according to a third embodiment of the present invention.

FIG. 9 is a diagram illustrating the wireless communication method shown in FIG. 6A according to a third embodiment of the present invention. As shown in FIG. 9, device 10 may schedule a WLAN frame exchange sequence with AP 20, transmit a suitable sized P1 frame to let the acknowledge frame (ACK/BA) transmitted from AP 20 to fit in overlapped RX1/RX2 period (as long as co-located WLAN/BT simultaneous reception is adopted in device 10). The timing of the transmission of the acknowledgement ACK corresponding to the packet P1 is not a limitation of the present invention.

Figure 10:
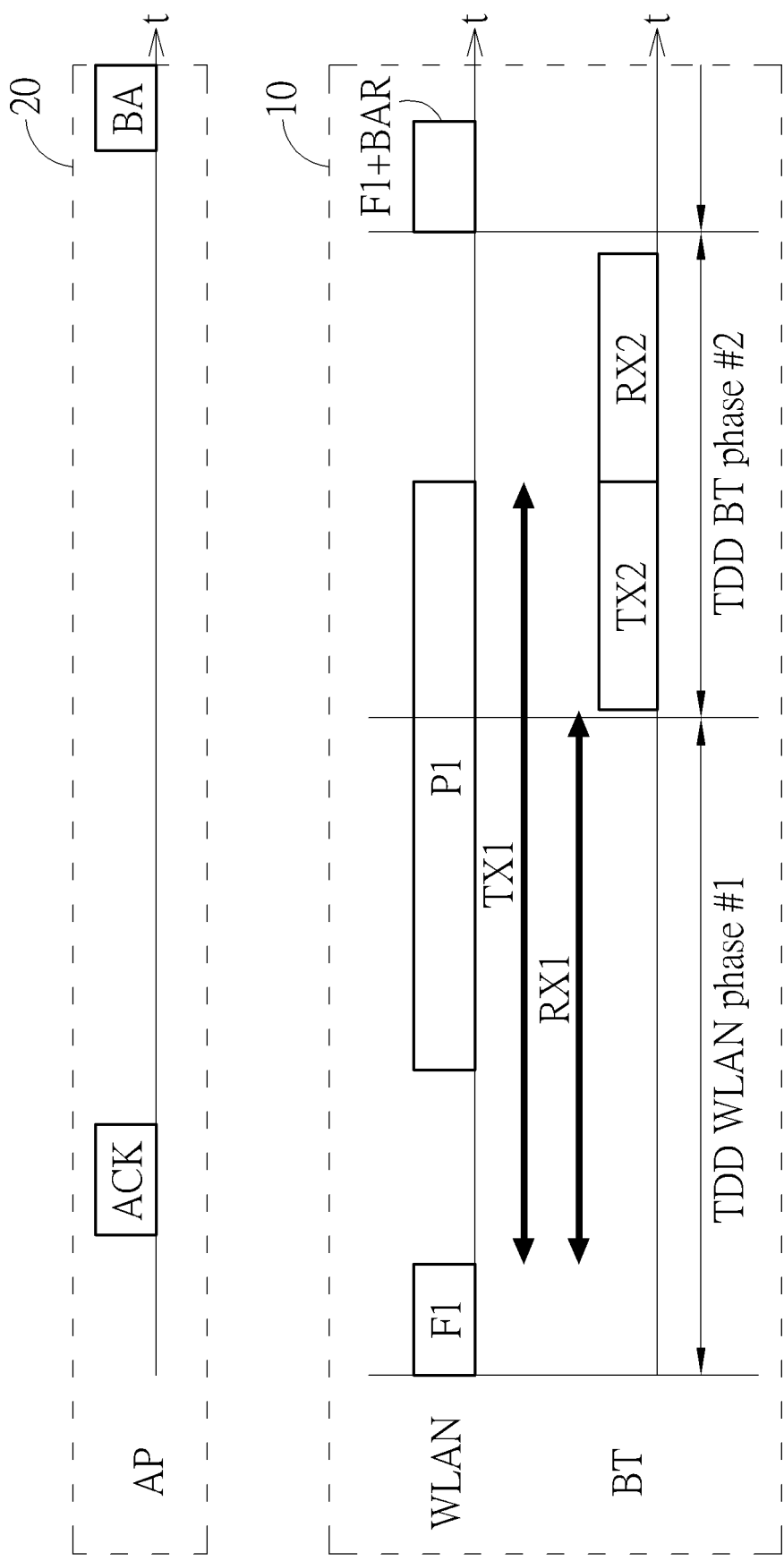
FIG. 10 is a diagram illustrating the wireless communication method shown in FIG. 6A according to a fourth embodiment of the present invention.

FIG. 10 is a diagram illustrating the wireless communication method shown in FIG. 6A according to a fourth embodiment of the present invention. As shown in FIG. 10, device 10 may schedule a delay acknowledged WLAN frame exchange sequence with AP 20, transmit a suitable sized P1 frame to fully utilize the TX1 period, since this is a delay acknowledged frame exchange, AP 20 is need to transmit acknowledge (BA) frame after reception of P1 immediately. Instead, the AP 20 waits until the device 10 transmits an acknowledgement request signal BAR to the AP 20 to request the acknowledgement ACK corresponding to the packet P1, then the AP 20 transmits the BA frame to acknowledge the reception of packet P1. The device 10 may embody the BA request into F1 frame as shown in FIG. 10.

In other embodiments, the frames F1 and F2 transmitted from the device 10 may further comprise information to inform the AP 20 of a suggest transmission parameter (for example, transmission power or MCS) for transmitting signals to the device 10 in order to decrease the chance of signals from the AP 20 being sabotaged by other strong signals.

Please note that the device 10 is not limited to using separate antennas for communicating in the first communication network and the second communication network. In some embodiments, the co-located radios (for example, WLAN, BT and LTE) in device 10 may share the antennas as long as simultaneous transmissions (during overlapped TX1/TX2 period) or simultaneous receptions (during overlapped RX1/RX2 period) is adopted in device 10.

Figure 11:
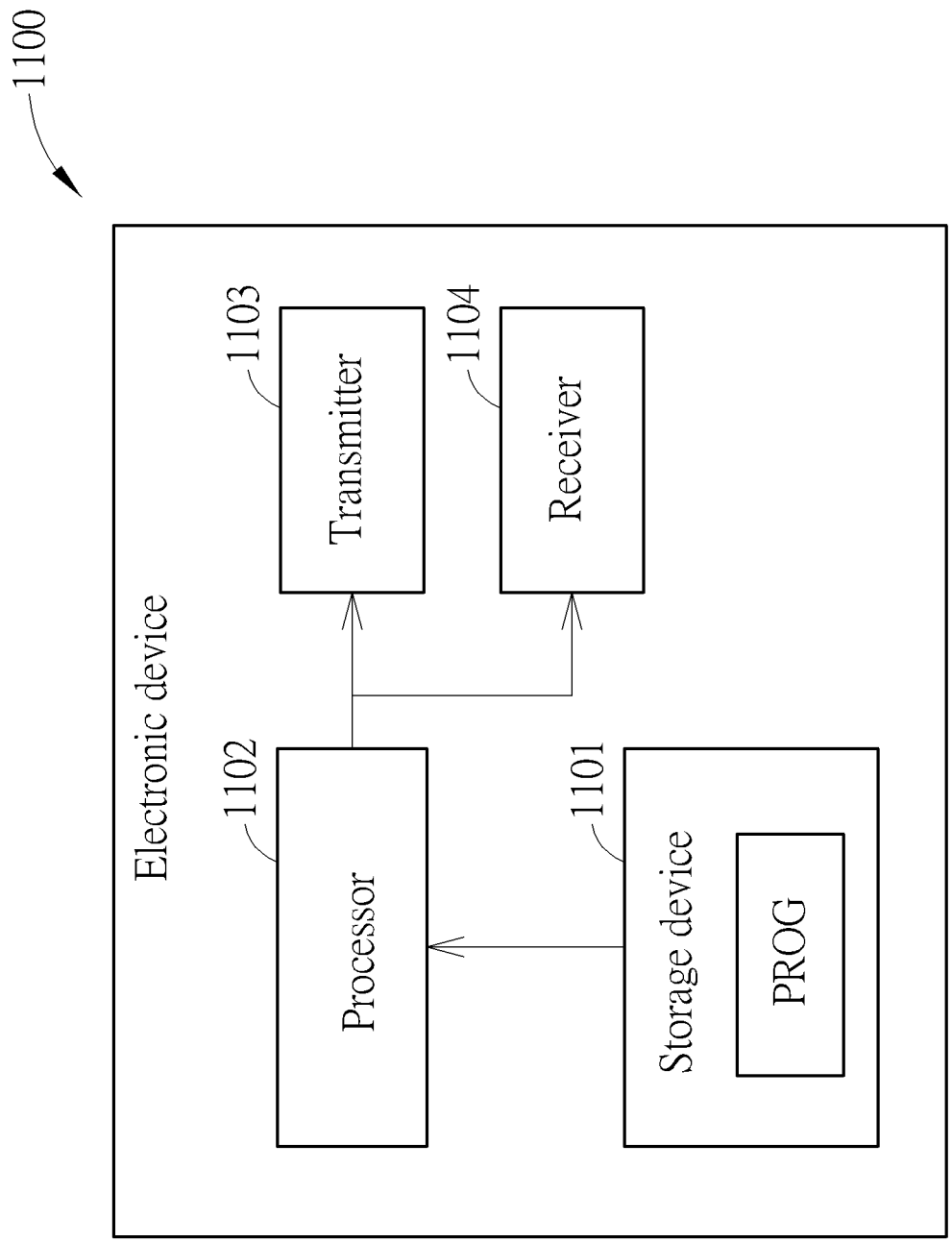
FIG. 11 is a diagram illustrating an electronic device according to an embodiment of the present invention.

FIG. 11 is a diagram illustrating an electronic device 1100 according to an embodiment of the present invention. The electronic device 1100 can be used to implement the device 10 shown in the embodiments of FIG. 1 to FIG. 10 for executing the wireless communication method proposed by the present invention. As shown in FIG. 11, the electronic device 1100 comprises a storage device 1101 for storing a program code PROG, a processor 1102, a transmitter 103 and a receiver 1104, wherein the processor 1102 can be used to implement the control circuit mentioned in the embodiments of FIG. 1A to FIG. 10. When loaded and executed by the processor 1102, the program code PROG instructs the processor 1102 to execute the wireless communication methods shown in the embodiments of FIG. 1A to FIG. 10. The detailed description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method applied to a device, comprising:
   generating a first communication information according to a second communication information, wherein the first communication information is arranged to indicate a transmission capable period and a reception capable period of the device arranged to communicate with a peer in a first communication network, and the second communication information is arranged to indicate a transmission period and a reception period of the device for communicating in a second communication network which is different from the first communication network;
   transmitting a first frame comprising the first communication information to the peer in the first communication network to initiate a first communication phase with the peer; and
   wherein the method further comprises:
      after transmitting the first frame, receiving/transmitting a signal from/to the peer in the reception/transmission capable period arranged to communicate with the peer in the first communication network; and
      transmitting/receiving an acknowledgement corresponding to the signal to/from the peer in the transmission/reception period of the device arranged to communicate in the second communication network;
   or the method further comprises:

after transmitting the first frame, receiving/transmitting a signal from/to the peer in the reception/transmission capable period arranged to communicate with the peer in the first communication network; and transmitting a second frame comprising at least an acknowledgement corresponding to the signal to the peer to initiate a second communication phase with an access point in the first communication network or transmitting a second frame comprising at least an acknowledgement request signal to the peer to initiate a second communication phase with the peer in the first communication network, wherein the acknowledgement request signal is arranged to request an acknowledgement corresponding to the signal.

2. The wireless communication method of claim 1, wherein when the reception period of the device arranged to communicate in the second communication network is before the transmission period of the device arranged to communicate in the second communication network, the reception capable period of the device arranged to communicate with the peer in the first communication network overlaps the reception period of the device arranged to communicate in the second communication network.

3. The wireless communication method of claim 1, wherein when the transmission period of the device arranged to communicate in the second communication network is before the reception period of the device arranged to communicate in the second communication network, the transmission capable period of the device arranged to communicate with the peer in the first communication network overlaps the transmission period of the device arranged to communicate in the second communication network.

4. The wireless communication method of claim 1, wherein the first frame further comprises a transmission power and/or modulation and coding scheme information to inform the peer of a required transmission power and/or modulation and coding scheme for transmitting signals to the device.

5. The wireless communication method of claim 1, further comprising:
transmitting data via a transmitter antenna of the device during the transmission capable period of the device arranged to communicate with the peer in the first communication network; and
transmitting data via the transmitter antenna of the device during the transmission period of the device arranged to communicate in the second communication network.

6. The wireless communication method of claim 1, further comprising:
receiving data via a reception antenna of the device during the reception capable period of the device arranged to communicate with the peer in the first communication network; and
receiving data via the reception antenna of the device during the reception period of the device arranged to communicate in the second communication network.

7. A wireless communication method applied to a peer, comprising:
receiving a first frame comprising a first communication information from a device in a first communication network to initiate a first communication phase with the device;
wherein the first communication information is arranged to indicate a transmission capable period and a reception capable period of the device arranged to communicate with the peer in a first communication network;

wherein the first communication information is generated according to a second communication information, and the second communication information is arranged to indicate a transmission period and a reception period of the device for communicating in a second communication network which is different from the first communication network; and wherein the method further comprises:
after receiving the first frame, transmitting/receiving a signal to/from the device in the reception/transmission capable period arranged to communicate with the peer in the first communication network; and
receiving/transmitting an acknowledgement corresponding to the signal from/to the device in the transmission/reception period of the device arranged to communicate in the second communication network;

or the method further comprises:
after receiving the first frame, transmitting/receiving a signal to/from the device in the reception/transmission capable period arranged to communicate with the peer in the first communication network; and
receiving a second frame comprising at least an acknowledgement corresponding to the signal from the device to initiate a second communication phase with the peer in the first communication network or receiving a second frame comprising at least an acknowledgement request signal from the device to initiate a second communication phase with the peer in the first communication network, wherein the acknowledgement request signal is arranged to request an acknowledgement corresponding to the signal.

8. The wireless communication method of claim 7, wherein when the reception period of the device arranged to communicate in the second communication network is before the transmission period of the device arranged to communicate in the second communication network, the reception capable period of the device arranged to communicate with the peer in the first communication network is overlapped with the reception period of the device arranged to communicate in the second communication network.

9. The wireless communication method of claim 7, wherein when the transmission period of the device arranged to communicate in the second communication network is before the reception period of the device arranged to communicate in the second communication network, the transmission capable period of the device arranged to communicate with the peer in the first communication network is overlapped with the transmission period of the device arranged to communicate in the second communication network.

10. The wireless communication method of claim 7, wherein the first frame further comprises a transmission power and/or modulation and coding scheme information to inform the peer of a required transmission power and/or modulation and coding scheme for transmitting signals to the device.

11. An electronic device, comprising:
a transmitter;
a storage device, arranged to store a program code; and
a processor, arranged to execute the program code;
wherein when loaded and executed by the processor, the program code instructs the processor to execute the following steps:
generating a first communication information according to a second communication information, wherein the first communication information is arranged to indicate a transmission capable period and a reception capable period of the device arranged to communicate with a peer in a first communication network, and the second communication information is arranged to indicate a transmission period and a reception period of the device for communicating in a second communication network which is different from the first communication network; and controlling the transmitter to transmit a first frame comprising the first communication information to the peer in the first communication network to initiate a first communication phase with an access point; and wherein the program code instructs the processor to further execute the following steps:

after transmitting the first frame, receiving/transmitting a signal from/to the peer in the reception/transmission capable period arranged to communicate with the peer in the first communication network; and transmitting/receiving an acknowledgement corresponding to the signal to/from the peer in the transmission/reception period of the device arranged to communicate in the second communication network;

or wherein the program code instructs the processor to further execute the following steps:

after transmitting the first frame, receiving/transmitting a signal from/to the peer in the reception/transmission capable period arranged to communicate with the peer in the first communication network; and transmitting a second frame comprising at least an acknowledgement corresponding to the signal to the peer to initiate a second communication phase with the access point in the first communication network or transmitting a second frame comprising at least an acknowledgement request signal to the peer to initiate a second communication phase with the peer in the first communication network, wherein the acknowledgement request signal is arranged to request an acknowledgement corresponding to the signal.

12. The electronic device of claim 11, wherein when the reception period of the device arranged to communicate in the second communication network is before the transmission period of the device arranged to communicate in the second communication network, the reception capable period of the device arranged to communicate with the peer in the first communication network is overlapped with the reception period of the device arranged to communicate in the second communication network.

13. The electronic device of claim 11, wherein when the transmission period of the device arranged to communicate in the second communication network is before the reception period of the device arranged to communicate in the second communication network, the transmission capable period of the device arranged to communicate with the peer in the first communication network is overlapped with the transmission period of the device arranged to communicate in the second communication network.

* * * * *